United States Patent [19]

Buckley

[11] Patent Number: 4,739,346

[45] Date of Patent: Apr. 19, 1988

[54] DRIVE SYSTEM AND METHOD FOR INK JET PRINTER

[75] Inventor: Dennis J. Buckley, Nashua, N.H.

[73] Assignee: Advanced Color Technology, Inc., Cambridge, Mass.

[21] Appl. No.: 861,265

[22] Filed: May 9, 1986

[51] Int. Cl.⁴ .......................... G01D 15/24; H02P 8/00
[52] U.S. Cl. .................................... 346/138; 318/696; 310/49 R
[58] Field of Search ............ 346/138, 140, 75, 76 PH, 346/139 R; 235/467, 472; 400/124, 126, 144.2, 121, 240.3, 649; 310/49 R; 318/696

[56] References Cited

U.S. PATENT DOCUMENTS

| | | | |
|---|---|---|---|
| 4,275,339 | 6/1981 | Burke et al. | 310/49 R |
| 4,496,831 | 1/1983 | Swartz et al. | 235/472 |
| 4,620,198 | 10/1986 | Behun | 346/46 X |

OTHER PUBLICATIONS

Beling, T. E., "Permanent Magnet Step Motors", *Theory and Applications of Step Motors*, West Publishing Co: New York, 1944, pp. 206-251.

*Primary Examiner*—E. A. Goldberg
*Assistant Examiner*—Mark Reinhart
*Attorney, Agent, or Firm*—E. T. Barrett

[57] ABSTRACT

For requirements where constant velocity is important and positional error must be small and non-cumulative, a bipolar or unipolar, two-phase, permanent magnet stepper motor is driven by sawtooth currents in such manner as to produce a rotating magnetic field that exerts a substantially constant torque on the rotor. When using a bipolar stepper motor with windings electrically offset by 90°, two drive currents are generated that increase and decrease in amplitude linearly between predetermined maximum and minimum values. With a unipolar motor, four sawtooth waveforms, of single polarity, are provided. In either case, the currents are displaced by 90° to produce a rotating magnetic field of uniform amplitude.

A microprocessor controls the generation of a number of voltage ramps that control current generators for either the bipolar or unipolar stepper motor.

To control speed and torque, the slope of the current ramp and the repetition rate are varied until the motor has attained a steady operating state. The amplitude of the driving currents is determined indirectly by controlling the rate of the current increase of the ramp and the time before current directions of the phases are indexed.

20 Claims, 4 Drawing Sheets

DRIVE SYSTEM AND METHOD FOR INK JET PRINTER

BACKGROUND OF THE INVENTION

1. Field of the Invention

This invention relates to mechanical drive systems using stepper motors and in particular to such a drive system having special advantages for use in ink jet printers of the type having a rotating imaging drum and in other applications where constant velocity is a requirement and positional error must be small and noncumulative.

2. Brief Description of the Prior Art

The imaging drum of an ink jet printer must be capable of operation at a constant speed with a high degree of positional accuracy. Servo systems with direct current motors have been used for applications of this kind but have several drawbacks. If a low-cost, low-resolution positional (angular) encoder is used, the system is subject to cumulative positional errors and is not ideal for applications where the position of the driven object must be closely controlled. In an ink jet printer where it is desirable to provide resolution of the order of 2000 dots per inch over an eleven inch circumference, the dc motor servo requires the use of expensive and complex feedback. Such systems have been proposed using an expensive, high resolution encoder wheel in connection with the imaging drum and providing a slave electronic control circuit to regulate the speed. A synchronous motor does not provide an acceptable solution because of the excessive cost resulting from the accuracy requirement.

The use of a permanent magnet stepper motor would eliminate the problems associated with the cumulative error of low-cost direct current motor systems, but introduces new problems resulting from the natural oscillation caused by pulsing of stepper motors. When the rotor of a stepper motor is positioned at a pole position, zero torque is produced on the rotor, the torque increasing to a maximum mid way between the poles. The result is speed variation during the succesive steps and oscillation around the pole positions. Micro-stepping will provide a partial solution, but the result is not satisfactory for precision applications without a large increase in cost. The problem of oscillation is particularly apparent in applications in which the load has a relatively large inertia as does the imaging drum in an ink jet printer.

SUMMARY OF THE INVENTION

Permanent magnet stepper motors are readily available and low in cost. If the number of steps available from a stepper motor drive could be increased substantially to infinity, the stepper motor would provide a significantly improved drive. The present invention makes use of either a unipolar or bipolar stepper motor and controls the application of driving currents in such manner as to produce a constant torque and substantially eliminate the problem of oscillation.

When using a two phase bipolar stepper motor, two drive currents are generated that increase and decrease in amplitude linearly between predetermined maximum and minimum values. The two currents are equal in repetition frequency and are displaced in phase by 90°. With this arrangement, the magnitude of the magnetic field is constant and only the angular position changes. At steady state, the torque produced on the rotor by the magnetic field is a function of the lag angle which will be determined by the mechanical load. In a 90° two-phase stepper motor, linear ramping of the currents will result in a constant torque within a small percentage at all rotor angles.

Under the conditions described here, the rotational angle of the stepper motor rotor from a predetermined position closely corresponds to the phase angle of the currents through the drive windings measured from the same starting point. That angle is designated as "n" in this description and in the claims.

To provide speed and torque control, it is necessary to control the slope of the current ramp and the repetition rate until steady state operation is attained. The amplitude of the driving currents is determined indirectly by controlling the rate of the current increase of the ramp and the time before current directions of the phases are indexed.

A voltage generator produces a control voltage that drives a ramp generator which in turn controls current generators that produce the necessary currents for either the bipolar or unipolar stepper motor.

The voltage generator is in turn controlled by a microprocessor unit. This control system has particular advantages in an ink jet printer because the same processor also controls the flow of ink from the jets and simplifies synchronization of the system.

DESCRIPTION OF THE PREFERRED EMBODIMENT

Figure 1:
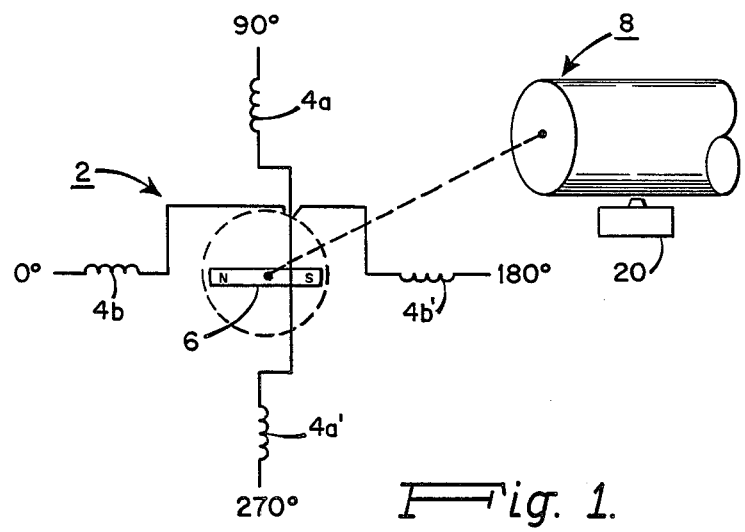
FIG. 1 is a diagrammatic view of a bipolar stepper motor coupled to the imaging drum of an ink jet printer.

As shown in FIG. 1, a conventional bipolar stepper motor, diagrammatically indicated at 2, has four circumferentially spaced windings 4a, 4a', 4b and 4b' and a magnetized rotor 6 that is connected to an imaging drum, generally indicated at 8, that forms part of an ink jet printer described more fully in the co-pending application of Arthur Cleary and Calvin Winey, Ser. No. 06/861,594, entitled "Method and Apparatus for Handling Sheet Materials" filed of even date herewith and assigned to the same assignee as the present application. For purposes of this description, it is assumed the stepper motor 2 is operating under steady state conditions with a uniform load so that the rotor lags the magnetic field by a constant angle, although it is recognized this angle will vary under changing load conditions and during acceleration and deceleration.

Rather than being operated in the usual step mode, the motor 2 is driven by a continual flow of current through the appropriate windings to produce a substantially constant torque on the rotor at all rotational positions. For example, when the rotor 6 is turning, in a clockwise direction as viewed in FIG. 1, and passes the poles associated with the windings 4b and 4b', maximum current flows through the windings 4b and 4b' while no current flows through the first two windings. The field produced by this current produces a clockwise torque on the rotor 6. As the rotor moves beyond the poles corresponding to windings 4b and 4b' the current through windings 4a and 4a' increases linearly from zero in a direction that attracts the rotor and moves it toward those poles. Simultaneously, the maximum current that was flowing in the windings 4b and 4b' is linearly reduced toward zero. The combined torque produced by the four poles is substantially constant at all positions of the rotor 6. The torque is constant if at all times the load is constant and:

$$Ia \sin n + Ib \cos n = K,$$

where
Ia and Ib are the currents, respectively, through the windings 4a and 4b, K is a constant and n is the angle of the rotor as stated above.

Figure 2:
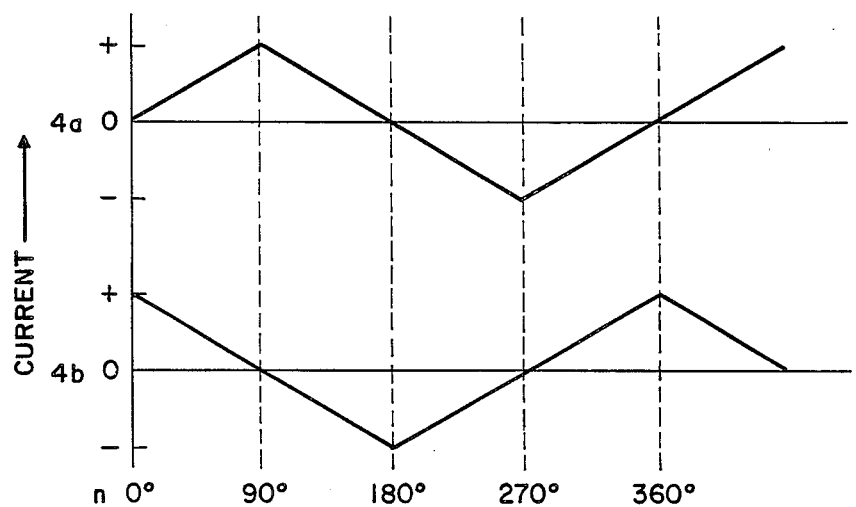
FIG. 2 is a graph showing the current variation through the windings of the stepper motor of FIG. 1 as a function of the phase angle.

The flow of current through the windings 4a and 4b is shown in FIG. 2. At the beginning of the chart, the current through windings 4a and 4a' is at zero and the current through the windings 4b and 4b' is at its maximum value. The rotor 6 is in the position shown in FIG. 1. After ninety degrees rotation, the current through the windings 4a and 4a' is at a maximum value and the current through the windings 4b and 4b' has decreased to zero. At this point, the current through the windings 4a and 4a' begins its linear decline while the current through the windings 4b and 4b' decreases in a negative direction. At 180°, the current through the windings 4a and 4a' has declined to zero and the current through the windings 4b and 4b' has reached its maximum value in the negative direction. At 270° of rotation, the current through the windings 4a and 4a' has reached its maximum value in a negative direction, while the current through the windings 4b and 4b' has reached zero. At 360 degrees of rotation, the currents are once again at their starting values and the current cycles continue to be repeated.

Figure 3:
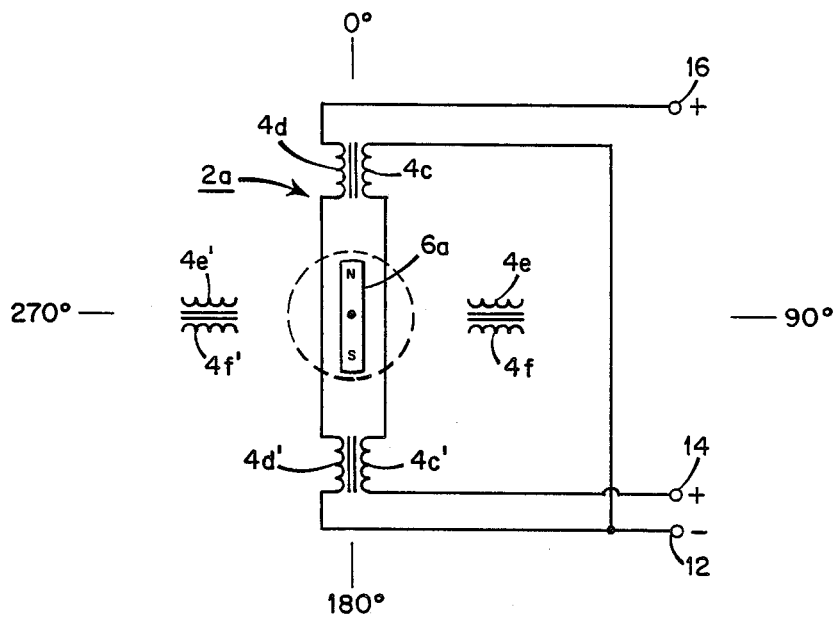
FIG. 3 is a diagrammatic view of a unipolar stepper motor.

The stepper motor 2 can be driven from a single voltage source by using a bridge circuit to obtain the necessary current reversal. A preferred arrangement, however, is to use a unipolar stepper motor having bifilar windings. Such a motor is illustrated diagrammatically at 2a in FIG. 3. Each of the four poles is provided with two separate windings so that a single polarity of current can produce a magnetic field of either polarity by selectively energizing the appropriate one of the two sets of windings.

A winding 4c is connected in series with a winding 4c', positioned 180° out of phase. One end of the winding 4c is connected to a common input terminal 12, and the opposite end of the winding 4c' is connected to an input terminal 14. Another winding 4d is wound on the same core with the winding 4c and is connected in series with a winding 4d' wound on the same core with the winding 4c'. The winding 4d is connected to an input terminal 16 and the opposite end of the winding 4d' is connected to the common terminal 12. With this arrangement, winding 4c and 4c' is 180° out of phase with winding 4d and 4d' and a positive voltage applied to terminal 14 causes a flow of current through windings 4c and 4c' to produce a magnetic field of a first polarity.

Application of a positive voltage to the terminal 16 causes a flow of current through the windings 4d and 4d', which are wound in the opposite direction, producing a magnetic field of the opposite polarity. Two other sets of windings, 4e and 4e', and 4f and 4f', are connected in a similar manner to suitable input connectors. These connections are not shown, but will be apparent to one familiar with unipolar stepper motors.

Figure 4:
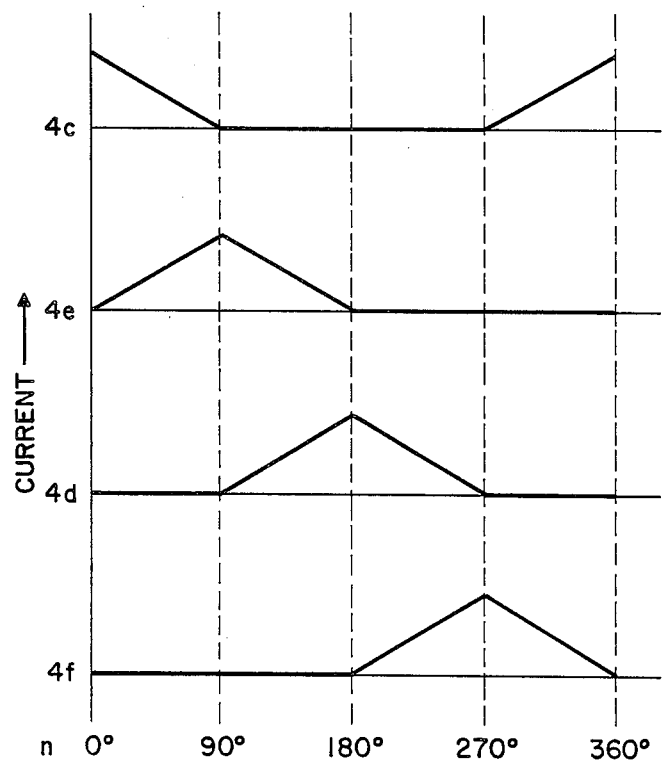
FIG. 4 is a graph showing the current variation through the windings of the stepper motor of FIG. 4.

FIG. 4 illustrates the current flow through the windings of the unipolar stepper motor 2a. At the beginning of the cycle, with the rotor 6a in the position shown in FIG. 3, no current is flowing in any of the windings except 4c and 4c'. The maximum current is flowing through windings 4c and 4c' in a direction so that the lag of the rotor behind the magnetic field produces a clockwise torque on the rotor 6a. As the rotor moves clockwise, the current through windings 4c and 4c' decreases linearly while the current through the windings 4e and 4e' increases linearly to create a constant magnetic field that always leads the rotor and applies a clockwise torque to the rotor 6a. By the time the rotor has moved 90°, the current through the windings 4e and 4e' has reached its maximum value, while the current through the windings 4c and 4c' has decreased to zero. The current through the other windings has remained at zero during this portion of the cycle. As the rotor leaves its 90° position, the current through the windings 4e and 4e' decreases linearly and the current through the windings 4d and 4d' increases from zero in a direction that imparts a clockwise torque to the rotor 6a. When the rotor reaches its 180° position, the current through the windings 4e and 4e' has dropped to zero while the current through the windings 4d and 4d' has reached maximum value. The current through the other two sets of windings has remained at zero throughout this 90° movement. As the rotor leaves the 180° position, the current through the windings 4d and 4d' starts to decrease while the current through the windings 4f and 4f' increases from zero in a direction to impart a clockwise torque to the rotor 6a.

When the rotor reaches its 270° position, the current through the windings 4d and 4d' has reached zero while the current through the windings 4f and 4f' has reached its maximum value. As the rotor 6a leaves its 270° position, the current through the windings 4f and 4f' begins to decrease and the current through the windings 4c and 4c' begins to rise generating a clockwise torque on the rotor 6a. At the 360° position, the starting conditions are again extant and the cycle repeats.

In the above explanation, the slope of the current change through the windings has been constant. However, to operate over a range of speeds and limit the power dissipation in the motor, it is necessary to alter this slope. For example, under starting conditions when the speed is slowest, the slope of the current change ramps must be less than it will be when the motor has reached full operating speed in order to prevent excessive peak currents. This result could be achieved by regulating the amplitude of the maximum current through the windings, but that would result in waveform distortion and a non-uniform torque. A more satisfactory approach is to alter the slope of the current ramps directly and change the length of the current cycles to appropriately limit the maximum current.

Figure 5:
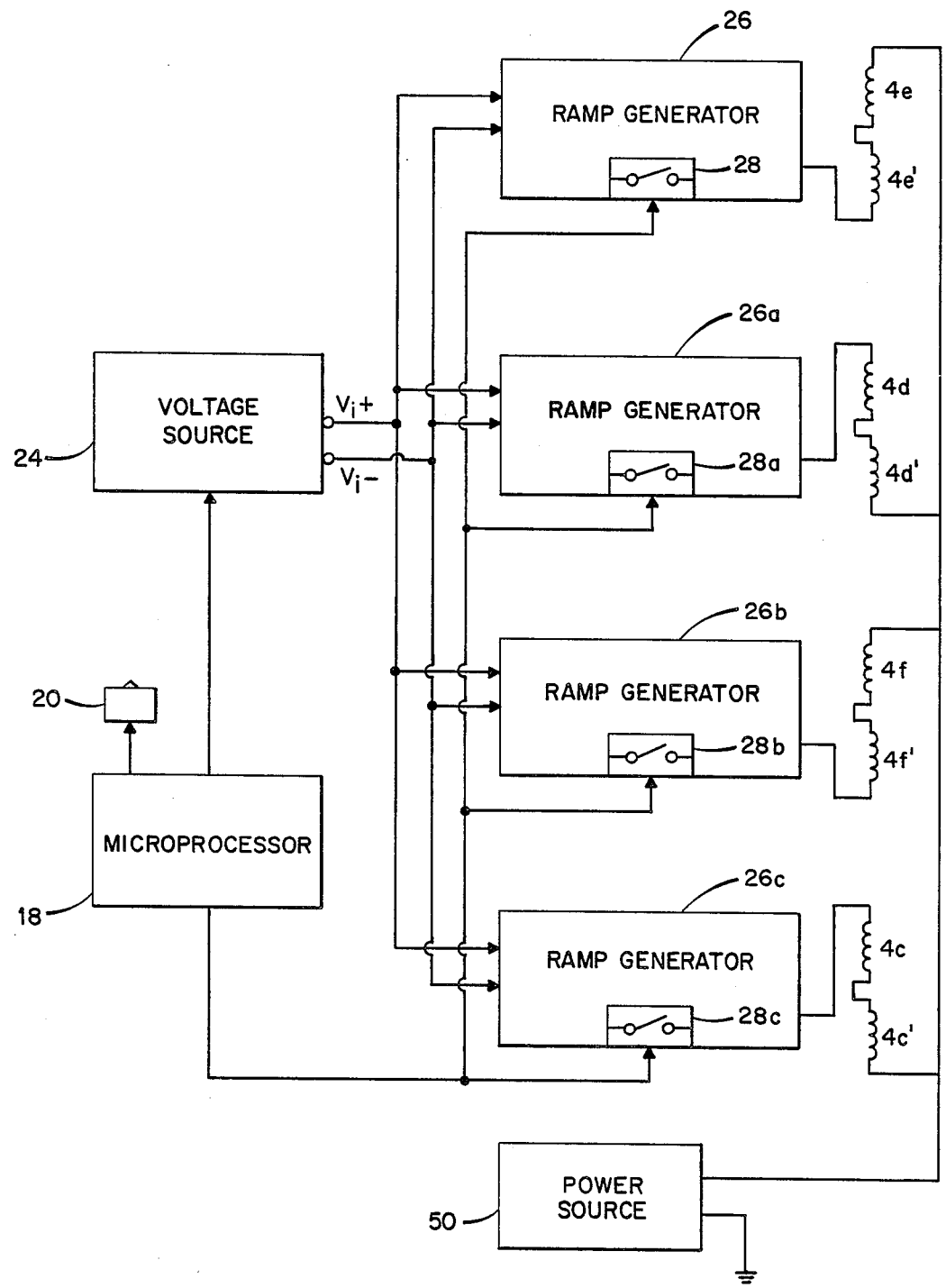
FIG. 5 is a block diagram of the operating system.

FIG. 5 is a block diagram of the operating system. A microprocessor unit 18, which also controls the operation of an ink jet print head 20 along with the other functions of the printer, controls a voltage source 24 that generates direct voltages Vi+ and Vi− that are respectively positive and negative with respect to each other. It will be shown that this generates a symmetrical positive and negative ramp.

These voltages are fed into four ramp generators 26, 26a, 26b and 26c, each generating appropriate drive currents for one pair of the windings of the unipolar stepper motor 6a. The ramp generator 26 includes a normally-closed analog switch 28 that is controlled by the microprocessor 18. This switch 28 initiates the creation of the sawtooth waveforms at the appropriate intervals. Similar switches 28a, 28b and 28c are included in the other ramp generators.

The microprocessor 18 controls the slope of the current ramp by controlling the magnitude of the voltages Vi+ and Vi−. Through the switches 28, (shown also as switches 28a, 28b and 28c in the other ramp generators) the microprocessor initiates the generation of the current ramps in the rotation necessary to produce the control pattern illustrated by FIG. 4. Through the switches 28, the microprocessor also controls the peak amplitudes of the driving currents by controlling the time during which the current build-up is allowed to continue.

Figure 6:
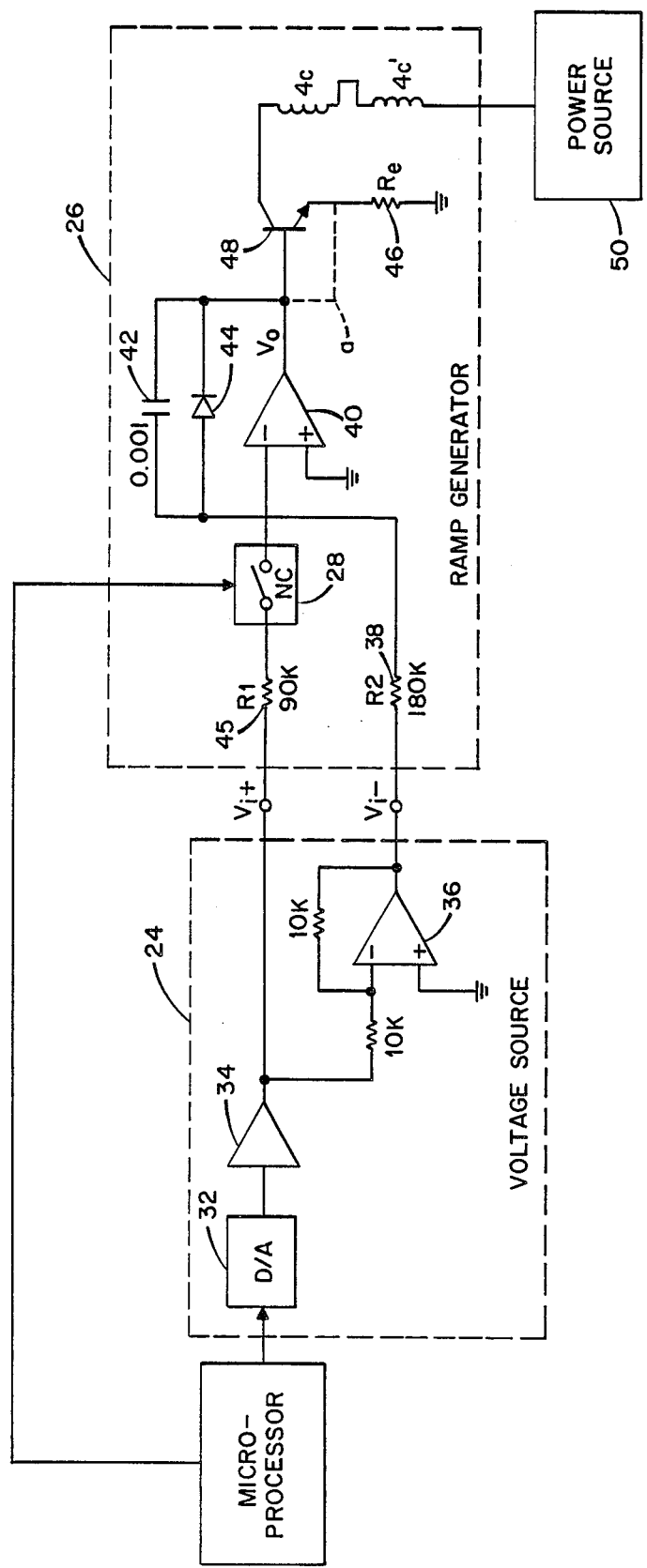
FIG. 6 is a diagram of the circuits for generating the ramp currents to drive the stepping motor of FIG. 3.

As shown in FIG. 6, the central processor unit 18 controls the output voltages Vi through a digital to analog converter 32 and its buffer 34. The negative value of Vi is obtained through an op-amp inverter 36 which functions in conventional manner.

The voltages Vi+ and Vi− are connected respectively to input terminals of the ramp generator 26. These voltages are connected also in a similar manner to each of the other current ramp generators 26a, 26b, and 26c.

When the analog switch 28 is opened by action of the microprocessor unit 18, only the negative voltage Vi− is applied through a resistor 38 to the negative terminal of an operational amplifier 40. The negative terminal of the operational amplifier 40 is connected through a capacitor 42 to the output. The diode 44 connected in parallel with the capacitor 42 prevents the output voltage Vo from becoming negative with respect to ground.

In operation, when the switch 28 is opened by the central processor unit, the output voltage of the ramp generator 26 will increase at a rate that is proportional to the input voltage from the voltage source 24, which is under the control of the microprocessor unit. When the switch 28 is closed, connecting the voltage Vi+ to the appropriate input voltage, the central processor unit controls the peak current of the drive.

The voltage developed across a resistor 46, connected between ground and the emitter electrode of a darlington transistor 48, is equal to the input voltage minus the Vbe drop of the transistor 48. One end of the windings 4c and 4c' is connected to a dc voltage power source 50 and the other end is connected to the collector electrode of the transistor 48. The current through the collector of the transistor is the same as the current through the the emitter resistor 46 less the base current, which is 1/B times the collector current. This decrease in current is not significant because the B of a darlington transistor is high. (Note: If the feedback capacitor 42 is connected to the emitter resistor 46, as indicated by the broken line "a", instead of to the base of the transistor 48, the op-amp 40 will compensate for the Vbe drop in the darlington transistor 48.) The current that flows through the windings 4c and 4c' is therefore a replica of the ramp voltage produced by the ramp generator 26. The dc voltage power source 50 is connected to each of the other pairs of motor windings as shown in FIG. 5.

The microprocessor 18 assures that the current flow through the different windings of the four current ramp generators is in accordance with that illustrated by FIG. 4. motor windings as shown in FIG. 5. The microprocessor 18 assures that the current flow through the different windings of the four current ramp generators is in accordance with that illustrated by FIG. 4.

The function of the op-amp integrator circuit can be described by:

$$Vo = -[(Vi_1 * T/R_1 * C) + (Vi_2 * T/R_2 * C)]$$

since $Vi_1 = -Vi_2 = Vi$, and $R_2 = 2R_1$, $$Vo = (-Vi * T/R * C),$$

where Vo is the output voltage of the voltage generator; $Vi_1$ is the negative voltage Vi− from the voltage source 24; $Vi_2$ is the positive voltage Vi+ from the voltage source 24; $R_1$ is the resistance of the resistor 45; $R_2$ is the resistance of the resistor 38; C is the capacitance of the capacitor 42; and T is ramp time during which the control voltages increase or decrease.

This would drive the output voltage Vo negative except for the diode 44 in the feedback circuit of the current ramp generator 26.

The drive sequence for the imaging drum 8 is as follows:

The input voltage to the ramp generators is adjusted so that the desired peak current through the windings will be reached at the end of the first step. The first current ramp generator is then started by opening the switch 28 of that generator.

At the end of the step interval, as established by the microprocessor unit, the first ramp generator is stopped by closing the switch 28, changing its its increasing current ramp to a decreasing ramp. At the same time, a second ramp generator is started which generates a sawtooth waveform displaced by ninety degrees from the first waveform.

At the end of the second step interval, the first ramp has returned to zero and the second ramp is at its peak. At this point, the switch 28 of the second ramp generator is closed and the current begins its linear decrease, while the third ramp generator is started to deliver current shifted by 180°. At the end of the third interval, representing a 270° movement of the rotor, the third ramp generator is at its peak and begins its decline to zero. The fourth ramp generator is started and applies increasing current to the appropriate windings.

At the end of the fourth interval, one complete magnetic cycle of rotation has been completed and the first ramp generator again starts, repeating the cycle.

The microprocessor 18, by adjusting the slope of the ramp and the interval of the step, controls the acceleration and deceleration of the imaging drum 8 to attain and hold the desired velocities.

For purposes of illustration the stepper motors illustrated here are shown with only four poles whereas, as is well known to those familiar with this art, such motors typically have of the order of 200 poles to provide the necessary indexing accuracy. A single winding may be associated with a number of magnetic poles and the illustration of a single winding may represent a number of parallel windings.

In a two-phase stepper motor the poles are angularly offset by a number of degrees equal to 360 divided by the number of poles and one electrical cycle of 360° moves four poles. If a two phase stepper motor has 200 poles, the poles are separated by 1.8 degrees and one electrical cycle is 7.2° of rotation.

By the term stepper motor is meant a motor having more than 12 poles and used primarily for indexing.

Substantially the same system as described above can be used with stepper motors having more than two phases. In those situations, a linear ramp is not appropriate and a sinusoidal or other shape will be selected to achieve the primary objective of a magnetic field of constant magnitude and uniform rotational velocity.

The stepper motor has particular advantages when used in the ink jet printer referenced above because of the advantageous control of the imaging drum and because the printing head can be controlled by the same microprocessor that controls the motor drive system. These same advantages are present in other printing and reading systems, for example in laser printers where a drum is scanned by laser beam and in systems where information is read from the drum. In the latter instance, the print head 20 may be considered to be any scanning device such as a photoelectric cell.

I claim:

1. In a device having a rotating drum and scanning means for traversing the surface of said drum, the combination comprising
    a stepper motor having a magnetic rotor and a plurality of fixed windings,
    a plurality of voltage generating means each producing a continuous repetitive waveform varying in amplitude between predetermined maximum and minimum values,
    a plurality of current generating means each coupled to one of said windings and under the control of one of said voltage generating means, thereby to create a rotating magnetic field of substantially constant intensity throughout the cycle of rotation, and
    mechanical means connecting said rotor to said drum.

2. Apparatus as claimed in claim 1 including
    microprocessor means connected to said voltage generating means for regulating the amplitude and repetition rate of said waveforms.

3. Apparatus as claimed in claim 2 wherein
    said stepper motor includes a plurality of windings electrically offset by 90°, and
    said repetitive waveforms vary linearly in amplitude between said maximum and minimum values.

4. Apparatus as claimed in claim 2 including
    means under the control of said microprocessor means for controlling the operation of said scanning means.

5. Apparatus as claimed in claim 3 wherein
    each of said windings is bifilar.

6. Apparatus as claimed in claim 5 including
    peak amplitude control means under the control of said microprocessor means for changing the operating periods of said waveforms thereby to limit the peak amplitude of said waveforms.

7. Apparatus as claimed in claim 5 including
    ramp rate control means under the control of said microprocessor for controlling said voltage generating means thereby to control the rate of increase and decrease of the current produced by said current generating means.

8. In a printer having a scanning head and an imaging drum, drive means comprising
    a stepper motor having a permanent magnet rotor and a plurality of windings,
    means coupling said rotor to said imaging drum,
    current drive means connected to said windings for generating a plurality of current waveforms wherein the current of each waveform continuous increases and decreases periodically to produce a rotating magnetic field of substantially constant intensity throughout the period of rotation, and
    microprocessor means for controlling the repetition rate of said waveforms.

9. Apparatus as claimed in claim 8 wherein
    said windings are offset magnetically by 90° and a first one of said current waveforms through a first one of said windings increases substantially linearly between predetermined minimum and maximum values while simultaneously a second one of said waveforms through a second of said windings decreases substantially linearly from said maximum value to said minimum value, said current waveforms being applied successively to said windings at phase angle delays of 90°.

10. In an ink jet printer having a cylindrical imaging drum on which images are produced by a print head on a medium carried by the drum, the method of driving said drum comprising the steps of
    providing a stepper motor having a permanent magnet rotor and a plurality of discrete circumferentially-positioned windings,
    generating a plurality of continuous repetitive current waveforms displaced in phase and varying periodically between predetermined maximum and minimum values, and
    connecting said current waveforms respectively to each of said windings, said current waveforms producing a rotating magnetic field of substantially constant intensity.

11. The method as claimed in claim 10 including the additional step of
    varying the repetition rate of said current waveforms in accordance with the speed and load conditions of said rotor.

12. The method as claimed in claim 11 including the additional step of
    modifying the rate of increase of the current in said current waveforms in accordance with the speed and load conditions of said rotor.

13. The method as claimed in claim 10 including the steps of
    generating a plurality of repetitive voltage waveforms having the same repetition rate, and
    controlling the generation of said current waveforms in accordance with the characteristics of said voltage waveforms.

14. The method as claimed in claim 13 including the additional step of
    controlling the rate of voltage increase and decrease of said voltage waveforms in accordance with the speed and load conditions of said rotor.

15. The method as claimed in claim 13 including the additional step of
    varying the repetition rate of said voltage waveforms in accordance with the speed and load conditions of said rotor.

16. The method as claimed in claim 13 including the additional step of
    modifying the repetition rate and rate of increase and decrease of voltage of said voltage waveforms in accordance with the speed and load conditions of said rotor.

17. The method of driving a stepper motor having a permanent magnet rotor and a plurality of windings to produce substantially uniform rotational torque comprising the steps of
    generating a plurality of continuous repetitive voltage waveforms each increasing and decreasing successively between predetermined maximum and minimum values,
    producing under the control of said voltage waveforms a plurality of current waveforms each being directly related in rate of current increase and decrease to one of said voltage waveforms, and
    connecting said current waveforms to said windings.

18. The method as claimed in claim 17 including the additional step of
    varying the slope and duration of the voltage increase and decrease of said voltage waveforms in accordance with the load and velocity conditions of said rotor.

19. The method as claimed in claim 18 wherein
    said stepper motor includes a plurality of poles offset electrically by 90°, and
    said repetitive waveforms vary linearly in amplitude between said maximum and minimum values.

20. In a stepper motor drive system, the combination comprising
    a stepper motor having a permanent magnet rotor and a plurality of windings,
    voltage generating means producing a continuous repetitive sawtooth voltage waveform in which the voltage in each waveform increases and decreases periodically between predetermined minimum and maximum values, and
    current generating means connected to said windings under the control of said voltage generating means for producing repetitive current waveforms each directly related in ramp angle and maximum amplitude to one of said voltage waveforms to produce a rotating magnetic field of substantially constant magnitude.

* * * * *